United States Patent [19]

Mings

[11] 4,334,256

[45] Jun. 8, 1982

[54] AUTOMOTIVE SURGE SUPPRESSOR

[75] Inventor: Joe D. Mings, McKinney, Tex.

[73] Assignee: Texas Instruments Incorporated, Dallas, Tex.

[21] Appl. No.: 137,200

[22] Filed: Apr. 4, 1980

[51] Int. Cl.³ .............................................. H02H 3/22
[52] U.S. Cl. ....................................... 361/56; 361/91
[58] Field of Search ................. 361/56, 91, 111, 54, 361/55, 57, 110

[56] References Cited

U.S. PATENT DOCUMENTS 3,449,598 6/1969 Wright ............................ 361/56 X
3,626,249 12/1971 Snedeker .............................. 361/56
3,660,719 5/1972 Grenier ................................ 361/56

Primary Examiner—Harry E. Moose, Jr.
Attorney, Agent, or Firm—Richard L. Donaldson; Gary C. Honeycutt

[57] ABSTRACT

A high power semiconductor switching arrangement controlled by a sensing circuit to suppress transient surges while maintaining operating voltage. The magnitude of a surge determines the rate of current flow through the semiconductor arrangement to maintain the operating voltage required while dissipating the excess power across a load resistance.

6 Claims, 3 Drawing Figures

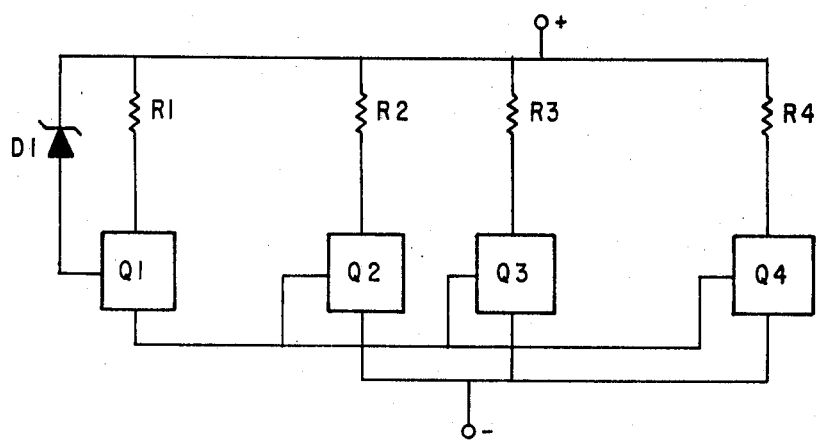
Fig. 1
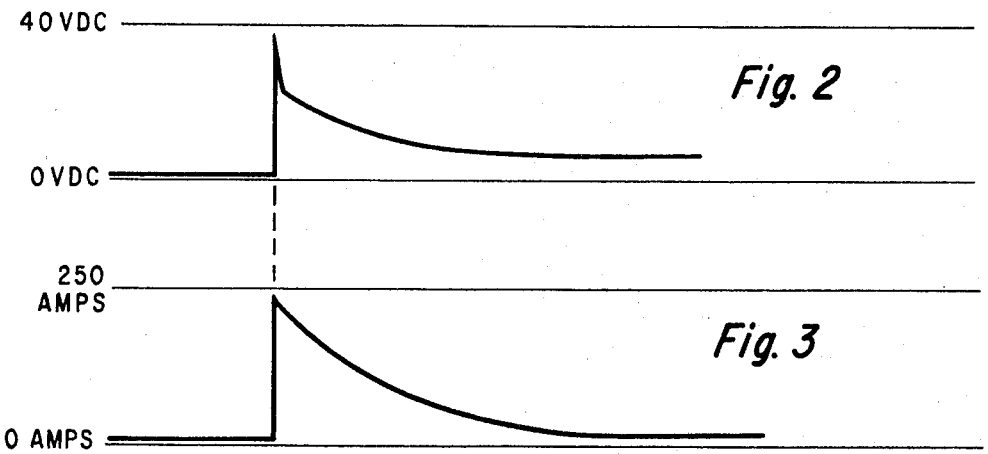
Fig. 2
Fig. 3

AUTOMOTIVE SURGE SUPPRESSOR

BACKGROUND OF THE INVENTION

1. Field of the Invention

This invention relates to an electrical current surge suppressor to protect an electrical system, and is particularly, but not exclusively, applicable to automotive electrical systems.

The automotive manufacturer has not until recently been greatly concerned about the problem of transient power surges. Most switching was done by mechanical means such as switches or relays, so that devices not in operation were isolated from surges or they were designed to withstand them.

With recent advances in technology, manufacturers have seen applications for low power complex devices which are very sensitive to transients of the type encountered in an automotive system where switching of heavy inductive loads such as headlights, air-conditioner, window, lights, etc., occurs frequently. These low power devices must be protected from transients so that damage is not done.

2. Prior Art Statement

Transient suppression has, up to now, been handled by self-switching devices, or devices requiring an external signal to switch. Most of these devices are commonly referred to as "crowbar" devices, and operate by either removing all current from or shunting around a load. To restore current, manual action such as resetting a circuit breaker or pressing a reset switch, is usually required. A recent development has been the "Varistor" a semiconductor device which is self-switching, and recovers once current has returned to a normal level for the application. However, the "crowbar" devices allow voltage across a system or device to approach zero, interrupting system or device operation.

The present invention approaches the problem of transients with a goal of non-interference with system operation, while retaining the ability to contain transients so that they are no longer hazards to be reckoned with.

SUMMARY OF THE INVENTION

According to the present invention, there is provided a Zener diode-transistor combination which is capable of sensing a surge in current. The diode senses a surge in current, and the transistor generates a signal which activates a high-power transistor arrangement. The surge is directed through a resistive load by the transistor switching, and the current flow through the resistive load and transistor arrangement maintains full operating power for the device or system while dissipating the excess power of the surge. The circuit is connected across the power source of the device or system, in parallel with other loads driven by the power source. In its quiescent state, the circuit presents a high impedance to the power source, and draws no current, while the other loads of the system operate normally. During a surge, the excess power is absorbed by the circuit as other loads operate uninterrupted.

The preferred embodiment of the invention comprises a Zener diode which senses a surge, causing the diode to conduct. The current flow in the diode is coupled to the base of a transistor, switching the transistor on. Current flow through the transistor is shared by the base of three other transistors in parallel, said three transistors being switched on. Each of the three other transistors has a resistor as a collector load such that when the three other transistors are switched on, the current surge is shared equally among said three resistor-transistor combinations. Power of the surge is dissipated across the resistors until the surge has passed.

Packaging of the surge suppressor is done in a modular manner to minimize the adverse effect of the harsh environment in which the suppressor must operate. The construction must be able to dissipate heat, withstand vibrations, and be relatively immune to wide variations in temperature. To achieve this, the circuitry is contained in an enclosure with a copper base. The circuit components are mounted on an insulator attached to the copper base, and the void filled with a thermally and electrically non-conductive material. Electrical connection to an automotive wiring harness is made by terminals fitted with within a recessed area of the enclosure compatible with an automotive type electrical connector. In a preferred embodiment, the circuitry is mounted on an insulator, for example, berylium oxide, which has been metalized on both sides with a highly conductive metal, for instance, palladium silver. The metalized insulator is mounted on a copper plate, which is the thermally conductive surface for the circuitry, the remainder of the enclosure being a plastic which is sealed to the copper base. Two electrical feed-through terminals are provided for connections to the power source. The void space the enclosure is filled with a thermally non-conductive dielectric material, for example, an epoxy resin, for protection of the circuitry.

DESCRIPTION OF THE PREFERRED EMBODIMENT

FIG. 1 is a schematic diagram of the present invention;

FIGS. 2 and 3 are representations of the peak voltage buildup across the circuit, and the peak current in the circuit, respectively, during test conditions.

DETAILED DESCRIPTION OF THE INVENTION

An automotive electrical system is typified as a low voltage-high current system. The switching of high-current loads such as motors, lights, coils, etc., in said system causes surges of current to appear. Devices sensitive to these surges could be damaged by these surges. To avoid possibility of damage, these surges must be eliminated or suppressed to safe levels.

The circuit shown in FIG. 1 does suppress surges of the type previously mentioned. Comprising an embodiment of the present invention is a voltage detection circuit which is connected to the power source and to surge control devices. The voltage detection circuit consists of a Zener diode D1 which is triggered into conduction at 27 volts, a semiconductor switch Q1, and R1, a collector load for Q1. The anode of D1 is connected to the base of transistor Q1, the cathode of D1 coupled to the power source positive terminal. When the power source voltage exceeds 27 volts, D1 conducts, making current available to the base of Q1. Current flow through its base-emitter junction turns on Q1, furnishing current through R1 and Q1 to bases of the power semiconductors. Resistors R1 limits the current available to the bases of the power transistors. When current does not flow in the base of power transistors Q2, Q3, and Q4, they will be turned on, and the surge responsible for their turn-on will be conducted through R2, R3, and R4, thereby being dissipated. To insure equal current distribution among the resistors, they possess a positive temperature coefficient. If one resistor draws more current, it will heat up, increasing its resistance, thus reducing current flow until it is equalized for each resistor. This characteristic enhances the reliability of the circuit by preventing heat build-up and eventual failure in any one resistor-transistor combination.

When power source voltage drops to a level below 27 volts, D1 ceases conduction. With no base drive current, Q1 cuts off and no base drive current is then available to Q2, Q3, and Q4. This shuts off the transistors and presents a high impedance to the power source so that in operating conditions no current is drawn by the suppressor.

The waveforms shown in FIGS. 2 and 3 were obtained by applying a simulated surge to the preferred embodiment at the time indicated by the dashed line between line between the two waveforms. As seen on the waveforms, the voltage buildup is limited to approximately 40 volts or less, while peak current flow is near 240 amperes. These peaks in voltage and current are brought back to operating level almost immediately by the circuit. To achieve the high peak current flow, and prevent high voltage buildups, resistors R2, R3, and R4 are 0.5 ohms each. While diode D1 activates the circuit at about 27 volts, surge peaks will increase the voltage across the circuit to the previously mentioned 40 volts. This voltage level may be quite high compared to normal operating voltage, but its transient nature precludes possibility of power buildup to a level that might cause damage to system components.

What is claimed is:

1. A circuit for protecting an electrical device or system from a transient power surge in its power source while maintaining full operating power to said device or system, comprising:
   means for detecting said surge;
   means for generating a control signal indicative of the presence of said surge;
   means responsive to said control signal for directing said surge through said circuit, having a plurality of series-coupled transistor-resistor current-carrying paths in parallel, each said path self regulated in current flow, all of said plurality of paths opened to current flow equally and simultaneously by a common signal.

2. A circuit as in claim 1, wherein said common signal is provided from a transistor which is turned on by a zener diode sensing an over-voltage condition of the input power.

3. A circuit as in claim 1, wherein resistor segments of said current-carrying paths are silicon resistors having a positive temperature coefficient.

4. A circuit as in claim 1, wherein said plurality of transistors each has its emitter connected to a common node, which is also connected to the output of said circuit, and each has its collector connected to one of said plurality of resistive loads.

5. A circuit as in claim 1, wherein said plurality of resistive load means are each connected between a common node which is also connected to the power input source, and the collector of one of said plurality of transistors.

6. A circuit as in claim 1, said circuit mounted on a berylium oxide insulator which has been metalized on both sides with palladium silver and mounted on a copper plate, and a plastic enclosure having two feed-through terminals for electrical connections, said plastic enclosure fitted to copper plate and permanently fixed, and void inside enclosure filled with epoxy.

* * * * *